United States Patent [19]

Janney et al.

[11] 3,860,343

[45] Jan. 14, 1975

[54] TRANSMIT-RECEIVE SUBSYSTEM FOR LASER RADARS

[75] Inventors: Gary M. Janney, Pacific Palisades; Henry R. Senf, Encino, both of Calif.

[73] Assignee: Hughes Aircraft Company, Culver City, Calif.

[22] Filed: Oct. 9, 1973

[21] Appl. No.: 404,837

[52] U.S. Cl. ............... 356/28, 356/5, 356/106 LR, 350/276 SL, 350/151, 330/4.3
[51] Int. Cl. ........................... G01p 3/36, G01c 3/08
[58] Field of Search ............ 356/4, 5, 28, 106 LR; 330/4.3; 350/276 R, 276 SL, 151

[56] References Cited
UNITED STATES PATENTS
| | | | |
|---|---|---|---|
| 3,488,606 | 1/1970 | Rigrod | 356/106 LR |
| 3,617,129 | 11/1971 | Skolnick | 356/106 LR |
| 3,732,013 | 5/1973 | Hieslmair et al. | 356/28 |
| 3,811,774 | 5/1974 | Honeycutt et al. | 356/28 |

Primary Examiner—Maynard R. Wilbur
Assistant Examiner—S. C. Buczinski
Attorney, Agent, or Firm—W. H. MacAllister; Lawrence V. Link, Jr.

[57] ABSTRACT

The transmit-receive subsystems disclosed herein are adapted for providing laser energy to a common optical train, and isolation for the receiver during a transmit mode of operation; as well as a low attenuation path to both transmit and receive signals. The transmit-receive subsystem includes a transmitter ring oscillator for producing laser energy and applying it in a first direction along a first optical path during the transmit mode of operation; and for directing energy applied in the opposite direction from the first optical path to the receiver unit. A ring isolator is coupled between the first optical path and the common optical train so as to provide for the unidirectional transfer of energy from the first optical path to the common optical train during the transmit mode, and for the reverse unidirectional transfer of energy during the receive mode.

18 Claims, 5 Drawing Figures

PATENTED JAN 14 1975

TRANSMIT-RECEIVE SUBSYSTEM FOR LASER RADARS

The invention claimed herein was made in the course of or under a contract or subcontract thereunder, with the United States Air Force.

BACKGROUND OF THE INVENTION

This invention relates to optical transmit-receive subsystems of the type adapted for use in laser radar systems.

It is sometimes desirable to use a common optical train, e.g. optical amplifiers, gimbals and telescopes, for transmitting and receiving laser radar signals. In many such applications only a small fraction of the transmitted signal power could saturate or damage the receiver's photodectectors; and so effective means for isolating the receiver during the transmit mode must be provided. Other requirements in certain laser radar applications are that the received signals be processed through a low attenuation path; and that the transmit and receive signals share the same path to minimize boresight errors resulting from differential phase shifts. Prior art techniques for implementing optical transmit-receive subsystems, such as optical switching devices, for example, have suffered from insufficient receiver isolation, high insertion loss, unacceptable boresight shifts between the transmit and receive modes, and/or the inability to efficiently process received signals which have encountered a large doppler frequency shift.

SUMMARY OF THE INVENTION

It is therefore a primary object of the subject invention to provide a common transmit-receive subsystem which will permit the transmit and receive signals of a pulsed laser radar to be processed through a common optical train while insuring that the receiver will not be adversely affected by the transmit signal and that the insertion loss to both the transmit and receive signals will be small.

Another object of the subject invention is to provide a transmit-receive subsystem for use with a laser radar which will allow the receive signals to be processed with minimum insertion loss even though they encounter a wide range of doppler frequency shift caused by radial target motion with respect to the radar.

Still another object of the invention is to provide a transmit-receive subsystem for use in a laser radar which will protect the receiver unit from transmitter power incidentally reflected from components in the common optical train, and from signals transmitted in the backward direction by laser power amplifiers in the common optical train.

Briefly, the subject invention relates to transmit-receive subsystems adapted for use in pulsed laser radars for providing laser energy to a common optical train while isolating a receiver unit during the transmit mode of operation, and for providing a low attenuation path from the common optical train to the receiver unit during a receive mode. The subsystem includes a unidirectional transmitter ring oscillator coupled to the optical train by a ring isolator. The receiver unit of the associated radar system is optically connected to a branch of the ring oscillator which is not excited by the transmitter due to the unidirectional circulation of laser energy therein; however, the receiver unit is efficiently coupled to receive signals applied to the transmitter ring oscillator because these signals are traveling in an opposite direction.

In accordance with some embodiments of the invention, the ring isolator contains a reversible non-reciprocal phase shifting element and means for obtaining a reciprocal variable phase shift. During the transmit mode the reversible non-reciprocal phase shifter is set to one of its two symmetrical states, and the ring isolator is tuned by means of the variable phase shifter, for maximum transmission of the laser energy to the optical train. In the transmit mode of operation the energy within the isolator circulates so that signals which come from the optical train towards the transmitter-receiver unit will be rejected by the isolator because these signals attempt to circulate in a direction for which the non-reciprocal phase shifter "detunes" the isolator circuit in the transmit mode. During the receive mode of operation the non-reciprocal phase shifter is switched to its other symmetrical mode and the ring isolator is then tuned for signals applied from the common optical train towards the receiver unit. The variable phase shift means also allows the ring isolator to be tuned for maximum received signal power, whereby the doppler frequency shift of the received signals may be "tracked."

BRIEF DESCRIPTION OF THE DRAWINGS

The novel characteristics of the invention both as to its organization and method of operation together with further objects and advantages thereof, will be better understood from the following description considered in connection with the accompanying drawings in which like reference characters refer to like parts and in which.

DESCRIPTION OF THE PREFERRED EMBODIMENTS

Figure 1:
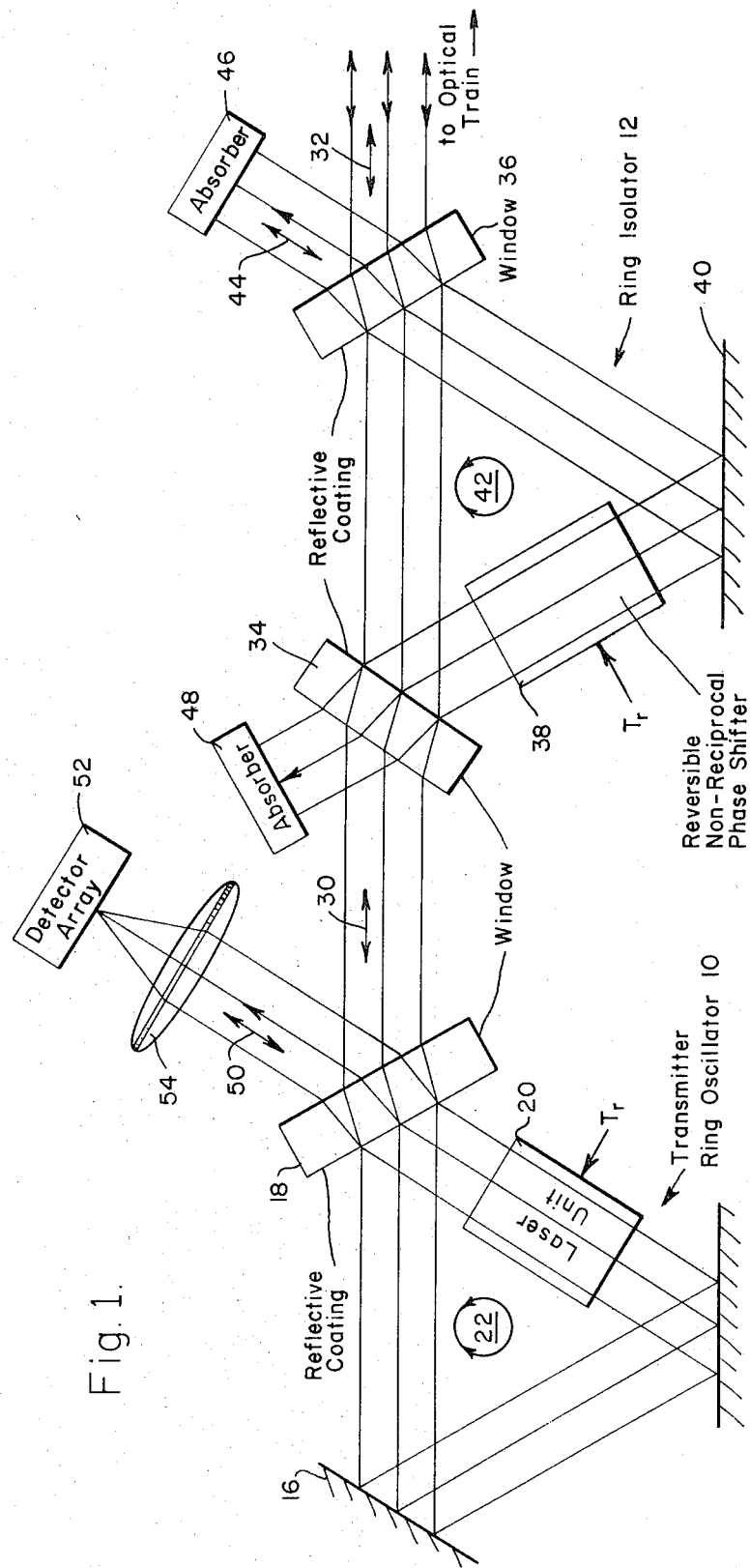
FIGS. 1 through 4 are each a block diagram of a different embodiment of a transmit-receive subsystem in accordance with the subject invention.

Referring first to the transmit-receive subsystem in accordance with the invention as shown in FIG. 1, as unidirectional transmitter ring oscillator 10 is coupled to an optical train (not shown) by means of a ring isolator 12. The optical train may include, for example, optical amplifiers, gimbals, and a telescope.

Transmitter ring oscillator 10 includes a pair of optical energy reflecting devices, illustrated as mirrors 14 and 16, a window 18 and a laser unit 20 disposed so as to form a closed optical path designated by reference numeral 22. The length of optical path 22 is selected such that it is approximately an even multiple of one-half a wavelength of the transmitted signal frequency ($f_t$) produced by laser unit 20.

Figure 5:
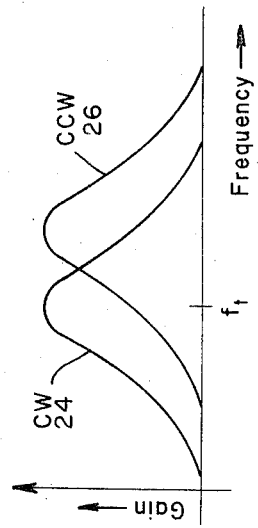
FIG. 5 is a diagram of the gain versus frequency for a flowing gas laser unit, which diagram is useful in explaining the operation of the transmit-receive subsystems of the subject invention.

Laser unit 20 may be of the type in which the laser medium is a flowing gas which when excited to a lasing state has a gain versus frequency response as shown in FIG. 5.

As depicted in FIG. 5, due to the doppler effect resulting from the motion of the flowing gas laser medium, the gain versus frequency response of the laser unit 20 is translated for the two directions of energy travel through the medium. For example, for the clockwise direction around loop 22 (FIG. 1) laser unit 20 might have a response depicted by curve 24 of FIG. 5, and for the counterclockwise direction the response of curve 26.

Again referring primarily to FIG. 1, the inner surface of window 18 has a specific reflectivity such that at the frequency $f_t$, the gain in the clockwise direction around path 22 exceeds the oscillation threshold. At the transmission frequency $f_t$ (and any other resonant mode of oscillator 10) the gain in the counterclockwise direction is insufficient to sustain oscillation. Hence, during the transmit mode of operation, when the laser unit 20 is enabled in response to a mode control signal $T_r$, an energy pulse which travels only in a clockwise direction around closed path 22 is generated; and exits through window 18 along an optical path 30. The signal $T_r$ is applied from a radar control subsystem (not shown) and is indicative of the transmit mode of operation of the system. Reference is directed to U.S. Pat. No. 3,691,477 which describes a diffraction grating coupled laser ring resonator that has a theory of operation similar to that of transmitter ring oscillator 10.

During the transmit mode of operation, the energy pulse produced by transmitter ring oscillator 10 is coupled through ring isolator 12 to an optical path 32 and from there to the optical train (not shown).

In the embodiment of FIG. 1, ring isolator 12 includes a pair of windows 34 and 36, a reversible non-reciprocal phase shifter 38 and an optical energy reflector element such as a mirror 40, disposed to form a closed optical path 42. Reversible non-reciprocal phase shifter 38 has two symmetrical states. For example, in response to the transmit mode control signal $T_r$ the element 38 effects a phase length for closed path 42 which is approximately an even multiple of one-half the wavelength of the frequency $f_t$ to energy traveling in a clockwise direction; and the length of path 42 is an odd multiple of one-half the wavelength of the transmission signal frequency to energy traveling in a counterclockwise direction.

The inner surface of windows 34 and 36 are partially reflective and during the transmit mode energy traveling in a clockwise direction around closed loop 42 is in phase at window 36 and exits therethrough to optical path 32. However, energy traveling in a counterclockwise direction is out of phase at window 34 and exits through window 36 along a path 44 to an obsorber element 46. Hence during the transmit mode of operation energy traveling towards the right along path 30 is applied through ring isolator 12 to path 32; while energy traveling towards the left from path 32 is applied to absorber 46.

During the receive mode of operation, as indicated by the absence of the transmit mode control signal $T_r$, the reversible non-reciprocal phase shifter 38 is switched to its second symmetrical state wherein the phase length of path 42 for the two directions of energy travel within ring isolator 12 is reversed from that described hereinabove relative to the transmit mode. That is, in the received mode the length of path 42 is equal to an even multiple of one-half the wavelength of the transmission frequency for signals traveling in the counterclockwise direction therethrough and is an odd multiple of one-half the wavelength of the transmission frequency for signals traveling in the clockwise direction. Hence, energy applied from path 32 traveling towards the left in FIG. 1, will be coupled through to path 30; while energy applied from path 30 towards the right in FIG. 1 will be out of phase at window 36 and will circulate through loop 42 in a clockwise direction so as to be applied through window 34 to an absorber 48. The degree of reflectivity of the inner surfaces of windows 34 and 36 is selected in accordance with the desired degree of isolation to be provided by ring isolator 12.

The theory of operation of an optical isolator suitable for use as element 12 of FIG. 1 is presented in an article entitled "Proposed Interferometric Optical Isolator" starting at page 528 of the August 1970 edition of the IEEE Journal of Quantum Electronics. As described in this article a non-reciprocal phase shifter suitable for element 38 might comprise a pair of quarter-wave plates flanking a Faraday rotator. The operation of such a non-reciprocal phase shifter is based upon the use of magneto-optic principles; and reversal of the states of the phase shifter in accordance with the operation described hereinabove is accomplished by reversing the direction of the magnetic field of the Faraday rotator.

To summarize the operation of the transmit-receive subsystem of FIG. 1, during the transmit mode of operation, i.e. during the time of the application of the signal $T_4$, the laser unit 20 is driven to a sufficient lasing state so as to operate as a unidirectional oscillator and provide an output pulse through window 18 traveling along path 30 from left to right. The transmission pulse is coupled from path 30 to output path 32 by means of ring isolator 12, which during the transmit mode is tuned for energy traveling from left to right therethrough. During the transmit mode of operation the receiver unit, which is shown in FIG. 1 as a detector array 52, is not excited by the transmitter due to the unidirectional transmission of energy in the ring oscillator 10; and is protected by ring isolator 12 from transmitter power incidentally reflected from components in the optical train and from signals transmitted in backward direction by laser power amplifiers in the optical train. During the transmit mode of operation ring isolator 12 is detuned to energy traveling from right to left therethrough.

During the receive mode of operation (absence of the transmit mode control signal $T_r$) the state of non-reciprocal phase shifter 38 is reversed and the ring isolator 12 is tuned to signals traveling from right to left therthrough. Therefore during this mode received signals from the optical train are coupled from path 32 to path 30. From path 30 the received signals are coupled by ring oscillator 10 and lens 54 to detector 52.

The laser unit 20 would normally be implemented such that during the received mode of operation the gain thereof would be reduced to a level which will prevent its operation as an oscillator; although the gain i.e. lasing level may be maintained at a sufficient point to allow the unit to act as an amplifier to the received signals. It is noted that for applications where a continuous laser power generating operation is employed that during the receive interval, i.e. when non-reciprocal phase shifter 38 is switched to the receive state, energy attempting to travel from left to right through the isolator 12 will be diverted to absorber 48.

Figure 2:
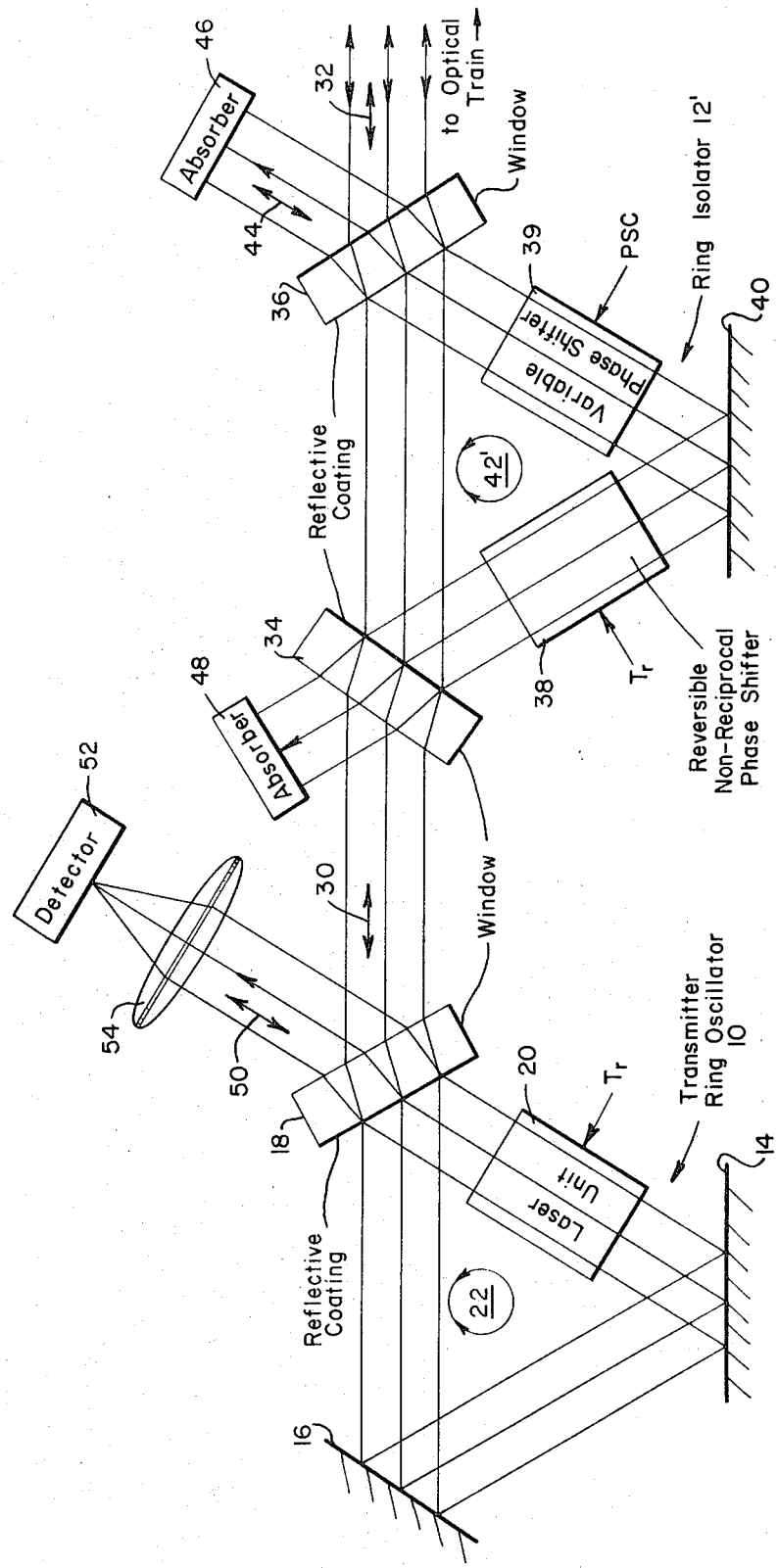

Referring now primarily to FIG. 2, the embodiment there shown incorporates a variable phase shifter 39 in closed path 42' of the ring isolator 12'. Variable phase shifter 39 may be any suitable device, such as an electro-optical device as is known in the art, which provides reciprocal phase shift (same phase shift in each direction) of an amount determined by a phase shift control signal (PSC) applied thereto.

In the operation of the system of FIG. 2 the variable phase shifter 39 is adjusted during the transmit mode to maximize the transmitted power; for example, by detecting and minimizing the amount of power applied to absorber 48. Against stationary targets this just described adjustment of phase shifter 39 should also be satisfactory for the receive mode of operation assuming that the states of reversible non-reciprocal phase shifter 38 are indeed symmetrical. However, if there is some non-symmetry in element 38; or more importantly in the operation of the system against targets having high radial velocities (large doppler shifts) the phase shift of element 39 is adjustted during the receive mode to maximize the energy received by detector 52. As noted hereinabove, the ability to efficiently process received signals having large doppler frequency translations is one of the major advantages of the subject invention.

It is noted that absorber 48 in the left hand branch of the ring isolator does not receive power in the transmit mode when the isolator is perfectly adjusted, but is provided to dissipate energy which is applied to this branch when the isolator is improperly adjusted or is in the process of being adjusted.

Preferably the external surfaces of all coupling windows are anti-reflection coated. The internal surface of window 18 is coated for a value of reflectivity selected as a function of the gain and other characteristics of the oscillator, as is known in the art. The inner surfaces of windows 34 and 36 are coated for a value of reflectivity which is selected as a function of the degree of isolation and insertion loss desired. If more isolation is required than can be conveniently obtained from a single ring isolator, one or more additional isolator, such as 12', may be added in cascade.

Figure 3:
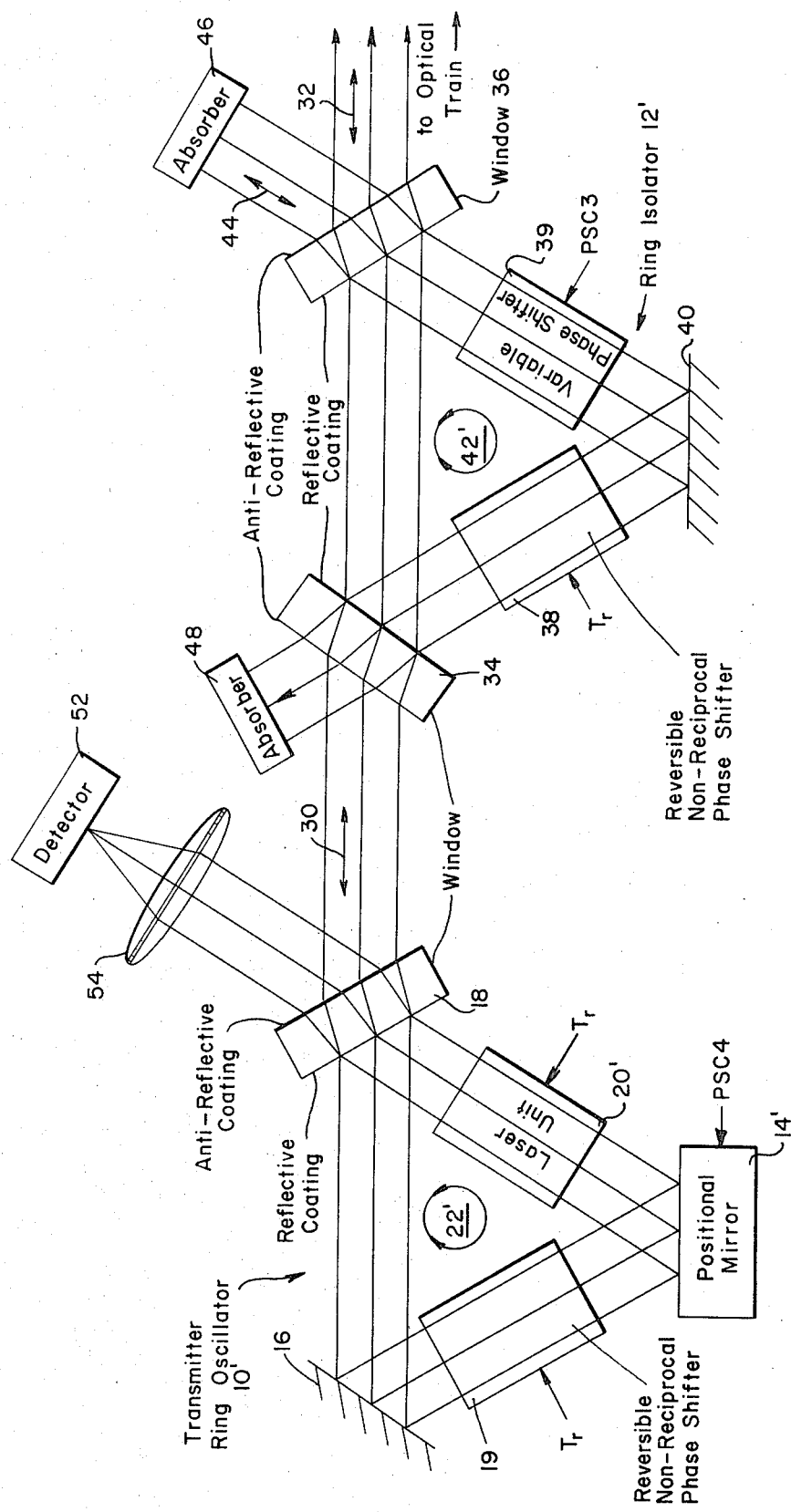

In the embodiment shown in FIG. 3, the transmitter ring oscillator 10' includes a reversible non-reciprocal phase shifter element 19 and a positionable mirror element 14' in the closed path 22' thereof. The values for reversible non-reciprocal phase shifter 19 are selected such that the length of closed path 22' is approximately equal to an even multiple of one-half the wavelength of the transmission frequency $f_t$ during the transmit mode of operation for energy traveling in the clockwise direction; and is equal to an odd multiple of one-half the wavelength of the transmission frequency to energy traveling in the counterclockwise direction. During the receive mode the directional phase shift characteristics of element 19 are reversed; i.e. the path length 22' is equal to an even multiple of one-half the wavelength of the transmission frequency to signals traveling in the counterclockwise direction and is an odd multiple to signals traveling in the clockwise direction. The incorporation of element 19 into path 22' insures the unidirectional characteristic of the transmission signal for laser units which do not exhibit the doppler shifted gain-frequency response of a flowing gas medium (see FIG. 5).

Still referring to FIG. 3, positionable mirror 14' which may comprise a mirror surface formed on a piezoelectric substrate element, allows for tuning the transmitter ring oscillator 10' during the transmit mode, i.e. the mirror position is controlled for maximum output power from the oscillator. However, mirror 14' could also be controlled to tune the loop for receive signals, i.e. to maximize the power applied to detector 52 and/or to reduce distortion during the receive mode of operation.

Figure 4:
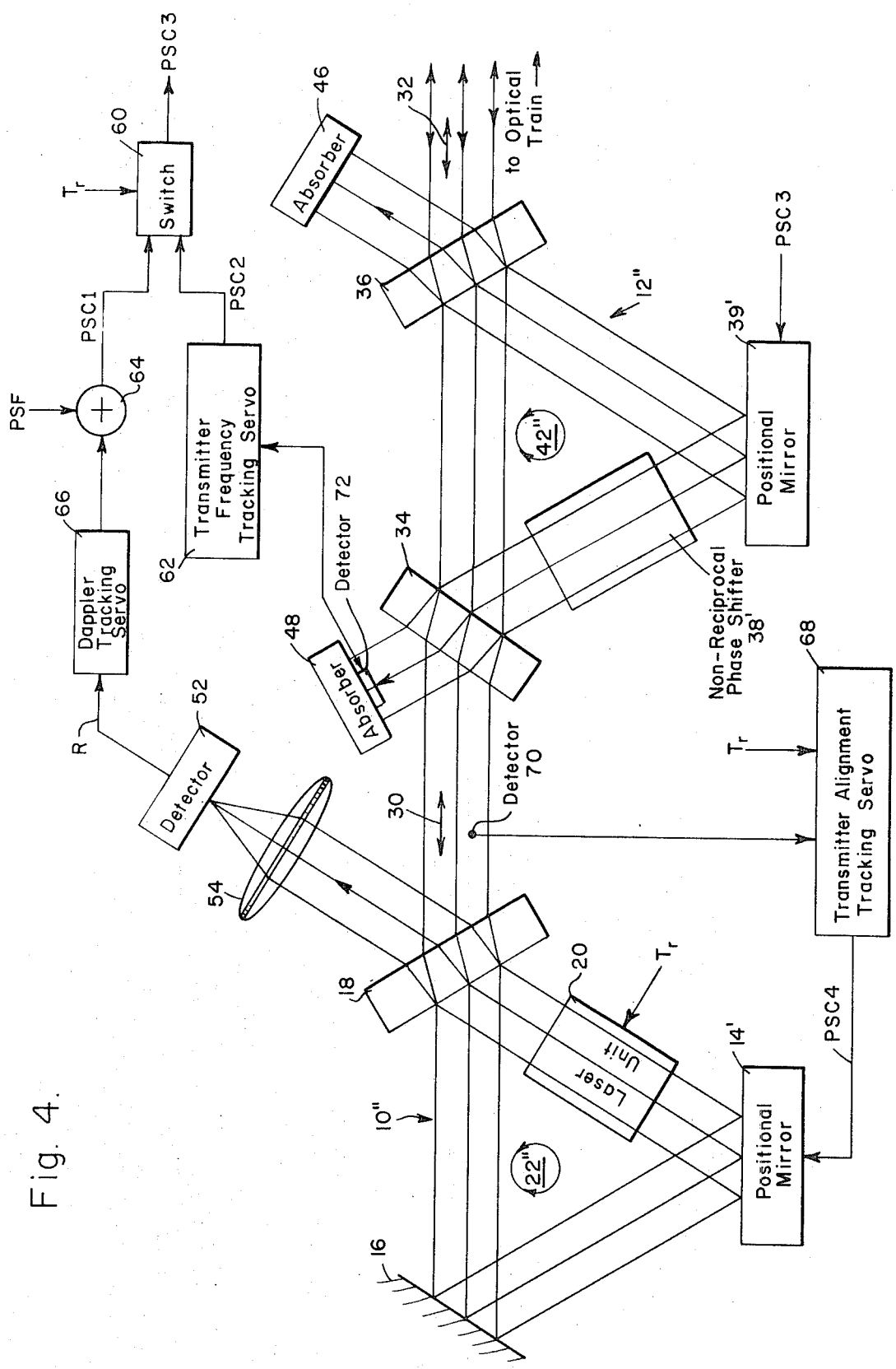

Referring now primarily to FIG. 4, as there shown the closed path 42" of ring isolator 12" has been modified from the previously embodiments so that the non-reciprocal phase shifter 38' need not be reversible. As will be described subsequently the function of reversing the non-reciprocal phase shift is implemented by the control of variable phase shifter 39', which in the embodiment of FIG. 4 is shown as a positionable mirror. Element 39' is controlled in response to a phase shift control signal designated PSC 3 which is applied thereto from the output circuit of a switch 60.

Switch 60 is controlled in response to the transmit mode control signal $T_r$ such that during the transmit mode of operation the output signal PSC 2 from a transmitter frequency tracking servo unit 62 is coupled through switch 60 to the output thereof; and during the receive mode of operation the output signal PSC 1 from a summation circuit 64 is applied through the switch.

One input signal to summation circuit 64 is a fixed value (PSF) which represents approximately an odd multiple of one-half a wavelength of phase shift; the other input to summation circuit 64 is provided by the output circuits of a doppler tracking servo unit 66.

The transmitter ring oscillator 10" shown in FIG. 4 includes positionable mirror element 14' which is controlled in response to the output signal PSC 4 of a transmit alignment tracking servo 68.

In the operation of the transmit-receive subsystem of FIG. 4, during the transmit mode the energy in path 30 is monitored by detector element 70 and the output signal therefrom is supplied to transmitter alignment tracking servo unit 68. Unit 68 adjusts the position of mirror 14' and therefore the path length 22 to optimize the transmitted power. Also during the transmit mode the energy applied to absorber 48 is monitored by a detector 72 and the output signal therefrom is applied to the transmitter frequency tracking servo 62 which in response thereto adjust the length of path 42" so as to optimize the percentage of energy being transmitted through ring isolator 12". It is noted that any problems with instability due to the adjustments of units 68 and 62 may be avoided by techniques well known in the art. For example the frequency responses of the two loops could be selected to avoid instability; or the adjustments can be made on a time shared basis, i.e. first the unit 68 being made operative to maximize the output of the transmitter ring oscillator 10"; and during the second time period the servo unit 62 is made operative to optimize the power transmission through ring isolator 12". In the time shared type of implementation, the adjustments would be periodically repeated in sequence with storage provided for the signals PSC 2 and PSC 4 during the inoperative periods of units 62 and 68, respectively.

To summarize the operation of the transmit-receive subsystem of FIG. 4, during the transmit mode of operation the mirror 14' is positioned in response to signals applied from tracking servo 68 so as to maximize the transmit energy in path 30; and mirror 39' is adjusted under the control of tracking servo 62 to minimize the power applied to absorber 48, and thereby maximize the transmission power applied to output transmission path 32. During the receive mode of operation the mirror 39' is controlled in response to the output signal from summation circuit 64 so as to maximize the output power (R) from detector 52. It is noted that the ring isolator 12'' is roughly tuned for the receive mode without the need for a reversible non-reciprocal phase shifter by means of the half wavelength offset provided by the signal PSF applied to summation circuit 64.

Thus having described a new and useful transmit-receive subsystem which is adapted for use in a pulse laser radar system, what is claimed is:

1. A transmit-receive subsystem adapted for use in a pulsed laser radar system for providing laser energy to a common optical path during a transmit mode of operation while isolating a receiver unit from the application of energy thereto, and for providing a low attenuation path from the common optical path to the receiver unit during a receive mode of operation, said transmit-receive subsystem comprising:

transmitter ring oscillator means for producing laser energy and applying it in a first direction along a first optical path during the transmit mode of operation, and for directing energy arriving from the opposite direction along the first optical path to a second optical path which is displaced from said first optical path; and ring isolator means optically coupled between said first optical path and the common optical path for providing the unidirectional transfer of energy from said first optical path to the common optical path during the transmit mode of operation, and for providing the unidirectional transfer of energy from the common optical path to said first optical path during the receive mode of operation;

whereby in a laser radar system having a receiver unit disposed along said second optical path, said subsystem provides laser energy to the common optical path while providing isolation of the receiver unit during the transmit mode, and during the receive mode a low attenuation path is provided from the common optical path to the receiver.

2. The subsystem of claim 1 wherein said ring isolator means includes first and second coupling windows having inner surfaces of specific reflectivity, and at least one optical energy reflective element disposed to form a closed optical path, with the outer surface of said first coupling window being disposed in said first optical path and the outer surface of said second coupling window being disposed in the common optical path; and non-reciprocal phase shifting means disposed in said closed optical path for providing during the transmit mode a first phase shift to energy circulating in one direction therethrough and a second phase shift to energy circulating in the opposite direction such that the length of said closed optical path is approximately an even multiple of one-half a wavelength of said laser energy to energy circulating in said first direction and an odd multiple thereof to energy circulating in said opposite direction, and for applying said second phase shift to energy circulating in said first direction and said first phase shift to energy circulating in said second direction during said receive mode.

3. The subsystem of claim 2 further comprising variable phase shifting means for adjusting the phase shift in said closed optical path of said ring isolator during the receive mode so as to maximize the percentage of energy coupled from said common optical path to said first optical path.

4. The subsystem of claim 3 wherein said variable phase shifting means includes means for sensing energy in said second optical path during the receive mode and for adjusting the phase shift in the closed optical path of said ring isolator so as to maximize said sensed energy.

5. The subsystem of claim 3 wherein said variable phase shifting means includes means for adjusting the phase shift in said closed optical path of said ring isolator means so as to maximize the energy transmitted from said first optical path to said common optical path during the transmit mode.

6. The subsystem of claim 1 wherein said transmitter ring oscillator means includes an active laser medium, optical energy reflecting devices and a coupling window having an inner surface with a specific reflectivity, disposed to form a closed optical path such that laser energy generated in said medium circulates in one direction along said closed path and exits through said coupling window along said first optical path in said first direction, and energy entering through said coupling window circulates in the opposite direction along said closed path and exits along said second optical path.

7. The subsystem of claim 6 wherein said transmitter ring oscillator means includes a variable phase shifter device disposed in the closed optical path thereof, and means to adjust the phase of said variable phase shifter device during said transmit mode to optimize the laser energy applied to said first optical path.

8. A transmit-receive subsystem adapted for use in a pulsed laser radar system for providing laser energy to a common optical path during a transmit mode of operation while isolating a receiver unit from the application of energy thereto, and for providing a low attenuation path from the common optical path to the receiver unit during a receive mode of operation, said transmit-receive subsystem comprising:

transmitter ring oscillator means for generating laser energy and applying said laser energy in one direction along a first optical path during the transmit mode of operation; and for directing energy applied in the opposite direction from said first optical path, along a second optical path which is displaced from said first optical path; and ring isolator means optically coupled between said first optical path and the common optical path for directing during the transmit mode, energy applied thereto from said first optical path to the common optical path and energy applied thereto from the common optical path to a third optical path which is displaced from said other optical paths; and for directing during the receive mode of operation, energy applied thereto from said common optical path to said first optical path;

whereby in a laser radar system having a receiver unit disposed along said second optical path, said subsystem provides laser energy to the common optical path while providing isolation of the receiver unit during the transmit mode, and during the receive mode a low attenuation path is provided from the common optical path to the receiver unit.

9. The subsystem of claim 8 wherein said ring isolator means includes first and second coupling windows having inner surfaces of specific reflectivity, and at least one optical energy reflective element disposed to form a closed optical path, with the outer surface of said first coupling window being disposed in said first optical path and the outer surface of said second coupling window being disposed in the common optical path; and non-reciprocal phase shifting means disposed in said closed optical path for providing during the transmit mode a first phase shift to energy circulating in one direction therethrough and a second phase shift to energy circulating in the opposite direction such that the length of said closed optical path is approximately an even multiple of one-half a wavelength of said laser energy to energy circulating in said first direction and an odd multiple thereof to energy circulating in said opposite direction, and for applying said second phase shift to energy circulating in said first direction and said first phase shift to energy circulating in said second direction during said receive mode.

10. The subsystem of claim 9 further comprising variable phase shifting means for adjusting the phase shift in the closed optical path of said ring isolator during the receive mode so as to maximize the percentage of energy coupled from the common optical path to said first optical path.

11. The subsystem of claim 9 further comprising variable phase shifting means for adjusting the phase shift in the closed optical path of said ring isolator means so as to maximize the energy transmitted from said first optical path to the common optical path during the transmit mode.

12. The subsystem of claim 10 wherein said variable phase shifting means includes means for adjusting the phase shift in the closed optical path of said ring isolator means so as to maximize the energy transmitted from said first optical path to the common optical path during the transmit mode.

13. The subsystem of claim 10 wherein said variable phase shifting means includes means for sensing energy in said second optical path during the receive mode and for adjusting the phase shift in the closed optical path of said ring isolator so as to maximize said sensed energy.

14. The subsystem of claim 8 wherein said ring isolator means includes first and second coupling windows having inner surfaces of specific reflectivity, and at least one optical energy reflective element disposed to form a closed optical path, with said first coupling window being disposed in said first optical path and said second coupling window being disposed in the common optical path; a non-reciprocal phase shifter which applies phase shifts to energy traveling in opposite directions therethrough which differ by approximately an odd multiple of one-half a wavelength of said laser energy; an electrically controllable bidirectional phase shifter device disposed in said closed optical path of said ring isolator means; and means for controlling the phase shift of said non-reciprocal phase shifter and said bidirectional phase shifter device such that in the transmit mode the percentage of laser energy applied from said first path to the common path is maximized and during said receive mode the percentage of energy applied from the common optical path to said first path is maximized.

15. The subsystem of claim 14 wherein said transmitter ring oscillator means includes an active laser medium, optical energy reflecting devices and a coupling window having an inner surface with a specific reflectivity disposed to form a closed optical path such that laser energy generated in said medium circulates in one direction along said closed path and exits through said coupling window along said first optical path in said first direction, and energy entering through said coupling window circulates in the opposite direction along said closed path and exits along siad second optical path.

16. The subsystem of claim 8 wherein said transmitter ring oscillator means includes an active laser medium, optical energy reflecting devices and a coupling window having an inner surface with a specific reflectivity disposed to form a closed optical path such that laser energy generated in said medium circulates in one direction along said closed path and exits through said coupling window along said first optical path in said first direction, and energy entering through said coupling window circulates in the opposite direction along said closed path and exits along said second optical path.

17. The subsystem of claim 16 wherein the closed path of said transmitter ring oscillator means is an even multiple of one-half a wavelength of said laser energy.

18. The subsystem of claim 16 wherein said transmitter ring oscillator means included a variable phase shifter device in the closed optical path thereof, and means to adjust the phase of said variable phase shifter device during said transmit mode to optimize the laser energy applied to said first optical path, and for adjusting the phase shift during the receive mode to optimize the energy applied to the receiver unit.

* * * * *